United States Patent
Turner et al.

(10) Patent No.: US 7,023,989 B1
(45) Date of Patent: Apr. 4, 2006

(54) ARRANGEMENT FOR DELIVERING APPLICATIONS TO A NETWORK ENABLED TELEPHONY DEVICE

(75) Inventors: Bryan C. Turner, Apex, NC (US); John Toebes, Cary, NC (US); Gregory Dean Pelton, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 800 days.

(21) Appl. No.: 09/883,211

(22) Filed: Jun. 19, 2001

(51) Int. Cl.
*H04L 12/66* (2006.01)

(52) U.S. Cl. .................. 379/900; 709/203; 709/220; 715/513; 370/352

(58) Field of Classification Search ............. 370/352, 370/356, 252; 709/220, 203; 715/513; 345/864; 379/900
See application file for complete search history.

(56) References Cited

U.S. PATENT DOCUMENTS

| | | | |
|---|---|---|---|
| D448,356 S * | 9/2001 | Hayon et al. | D14/151 |
| 6,449,269 B1 * | 9/2002 | Edholm | 370/352 |
| 6,493,437 B1 * | 12/2002 | Olshansky | 370/356 |
| 6,519,250 B1 * | 2/2003 | Fan | 370/352 |
| 6,731,630 B1 * | 5/2004 | Schuster et al. | 370/356 |

* cited by examiner

*Primary Examiner*—Jeffrey Pwu
*Assistant Examiner*—Phuoc H. Nguyen
(74) *Attorney, Agent, or Firm*—Leon R. Turkevich (57) ABSTRACT

A network-enabled user interface device, for example a VoIP telephony device, includes a display, a user input interface, an interface controller, and an application controller. The interface controller is configured for generating display elements for the display, controlling the user input interface based on received commands, and outputting responses to the application controller. The application controller is configured for outputting the commands to the interface controller based on application operations executed locally (i.e., within the user interface device), or remotely (e.g., by a server in communication with the user interface device). Remote application operations may include communications between the application controller and the remote server. The interface controller also may generate the display elements based on messages received from the network. Hence, the network-enabled user interface device can provide to the user interaction with arbitrary applications, executed locally or remotely, enabling any executable application to be provided to the user, independent of user action.

35 Claims, 5 Drawing Sheets

ARRANGEMENT FOR DELIVERING APPLICATIONS TO A NETWORK ENABLED TELEPHONY DEVICE

BACKGROUND OF THE INVENTION

1. Field of the Invention

The present invention relates to network enabled telephony devices, for example Voice over IP Telephones, configured for display applications remotely executable by a call server.

2. Description of the Related Art

Telephony devices have advanced to provide enhanced features for business consumers. For example, a business premises deploying a Private Branch Exchange (PBX) for intraoffice or interoffice communications utilizes telephony devices capable of receiving messages from the PBX, including a time of day string or a calling party identity string. However, proprietary PBX systems limit the availability of features that can be added to the telephony device. In addition, proprietary PBX systems typically provide voice-only services, such that text, data, or images cannot be transferred to the telephony device.

Voice over IP (VoIP) technology has evolved to provide network enabled telephony devices, for example Voice over IP telephony devices, configured for performing multiple operations that emulate a telephony device. VoIP telephony devices often include large display screens or other display capabilities, enabling new service features to be provided for a user. For example, the VoIP telephones, such as the commercially-available Cisco Telecaster 7960 IP Telephone from Cisco Systems, San Jose, Calif., includes user input and display operations. These user input and display operations enable a user to access multiple windows displaying respective applications based on soft key or hard key inputs, such as accessing a central telephone directory for retrieval of an employee's telephone number using a search query or selection from the displayed list. A user of the VoIP telephone can access one window configured displaying call status (e.g., duration of call, called party identity), or access another window configured for displaying the central telephone directory.

The executable software resident in the VoIP telephone, however, tends to be device-specific. Hence, the executable software needs to be rewritten for newer VoIP telephones having different hardware configurations (e.g., different sets of hard buttons, color display vs. greyscale display, different-sized display, etc.), although compatability issues may be reduced using hardware abstraction layers and input abstraction layers between the telephone display controller, the display portion, and the input portion. Moreover, the device-specific nature of the VoIP telephone software limits the manner in which different application services can be added to the VoIP telephone device for the device user: the VoIP telephone software needs to be modified to add the different application services. In addition, the VoIP telephone typically is configured for communication with a single call server, resulting in additional resource requirements imposed on the call server as services are added.

Browser-based telephony device technology is being implemented in wireless telephones using Wireless Application Protocol (WAP). In particular, WAP uses Extensible Markup Language (XML) technology to communicate interface changes to wireless devices such as digital wireless telephones and pagers, enabling applications and services to be provided to the digital wireless telephones. The use of XML tags enables the data to be displayed on the digital wireless telephone display in a prescribed manner.

The WAP-based approach to displaying data on the digital wireless telephone still suffers from the disadvantage that the input and display controllers of the digital wireless telephone interact with a single WAP portal (i.e., server), limiting the flexibility of the telephony device operations. In particular, a user is unable to send or receive a wireless telephone call on his or her web-enabled digital wireless telephone while using the digital wireless telephone to access the Internet.

Hence, the WAP-based systems still limit flexibility in delivering user interface applications to a telephony user.

SUMMARY OF THE INVENTION

There is a need for an arrangement that enables new services to be added to a telephony device, for example a VoIP telephony device having a user input interface and a display, independent of the hardware implementation of the user input interface or the display.

There also is a need for an arrangement that enables a telephony device, for example a VoIP telephony device, to independently access any one of multiple servers within an IP network for respective subscriber services.

There also is a need for an arrangement that enables multiple application servers to control a single IP-based client device in a prescribed manner.

There also is a need for an arrangement that enables any one of multiple applications, executed locally on a VoIP telephony device or remotely on a server in communication with the VoIP telephony device via an IP network, to cause actions to be performed by the VoIP telephony device, for example display and/or announce an application-defined display screen to the user, based on execution of the respective applications.

These and other needs are attained by the present invention, where a network-enabled user interface device, for example a VoIP telephony device, includes a display, a user input interface, an interface controller, and an application controller. The interface controller is configured for generating display elements for the display, controlling the user input interface based on received commands, and outputting responses to the application controller. The application controller is configured for supplying the commands to the interface controller based on execution of application operations. The application operating may be executed locally (i.e., within the user interface device), or remotely (e.g., by a server in communication with the user interface device). Remote application operations may include communications between the application controller and the remote server. The interface controller also may generate the display elements based on messages received from the network. Hence, the network-enabled user interface device can provide to the user interaction with arbitrary applications, executed locally or remotely, enabling any executable application to be provided to the user, independent of user action.

One aspect of the present invention provides a network-enabled user interface device. The device includes a display screen configured for displaying display elements, a user input interface configured for supplying user inputs, and an interface controller. The interface controller is configured for receiving application-based commands for at least one of first operations and second operations, and third operations. The interface controller also is configured for causing the display screen to display the display elements based on the first operations, configuring the user input interface for selected input operations based on the second operations, and generating application-based responses based on the supplied user inputs and the third operations. The device also includes an application controller configured for communication with executable application operations having generated the application-based commands and selectively transferring the application-based responses to selected ones of the executable application operations. The application controller includes a network interface configured for receiving the application-based commands and outputting selected ones of the application-based responses via an open protocol network. The generation and display of display elements based on received application-based commands, detected by the application controller, enables control of the display screen independent of telephony operations. Hence, the interface controller can cause the display screen to display the display elements for any number of concurrently executing applications, regardless of whether the applications are executed locally within the device or remotely by a server. Hence, the device is able to receive application-based display or input interface commands arbitrarily from any application, even during an existing telephone call.

Another aspect of the present invention provides a method of controlling a display screen and a user input interface of a network-enabled user interface device configured for network-based communications via an open protocol network. The method includes receiving application-based commands for execution of at least one of first operations, second operations, and third operations from at least one of a plurality of executable application operations, at least a first of the executable application operations in communication with the network-enabled user interface device via the open protocol network. The method also includes first generating, by an interface controller, selected display elements based on the first operations and selected input operations elements based on the second operations. The display screen is caused to display the selected display elements and the user input interface to execute the selected input operations elements. Application-based responses also are generated based on supplied user inputs to the user input interface based on the selected input operations elements, and based on the third operations.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
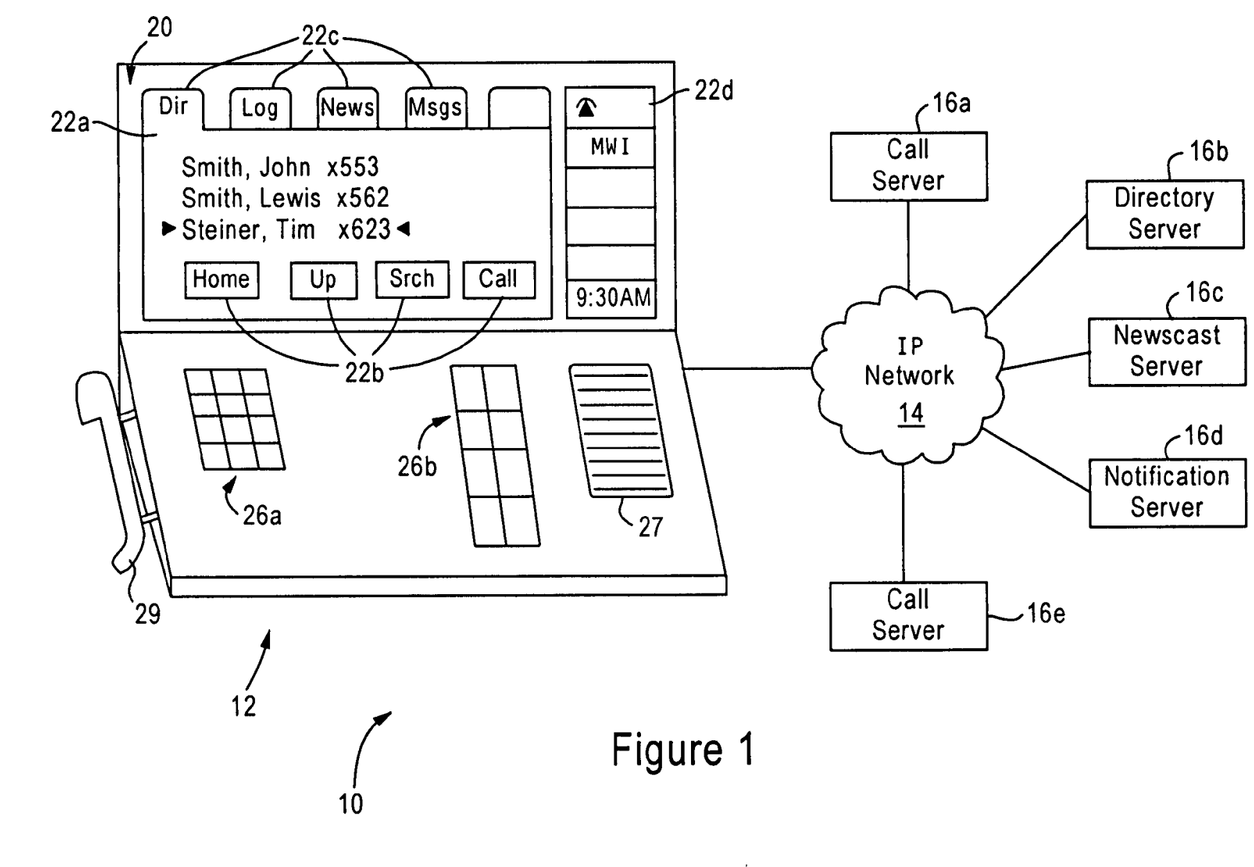
FIG. 1 is a block diagram illustrating a system for providing arbitrary applications to a network-enabled user interface device, for example a Voice over IP telephone device, according to an embodiment of the present invention.

FIG. 1 is a block diagram illustrating a system 10 for providing arbitrary applications to a network-enabled user interface device, for example a Voice over IP telephone device 12, according to an embodiment of the present invention. As shown in FIG. 1, the Voice over IP telephone device 12 is configured for communications by the IP network 14 with various servers 16 in communication with the Voice over IP telephone device 12 via the IP network 14. For example, the call servers 16a and 16e are configured for executing Voice over IP call processing applications according to a prescribed Voice over IP protocol, for example Media Gateway Control Protocol (MGCP) (RFC 2705), Session Initiation Protocol (SIP) (RFC 2543), H.323 protocol, etc. The corporate directory server 16b is configured for providing, for example, corporate telephone directory lists or email address lists, enabling a user of the Voice over IP device 12 to enter search queries based on name, location, reverse number search, etc. to identify the desired entry in the directory. The newscast server 16c is configured for providing selected newsworthy events, for example selected weather reports, stock quotes, and/or news headlines for internal corporate news or corporate news. The newscast server 16c may be configured for providing generic headlines, or user-specific headlines, as desired. The notification server 16d is configured for providing notification messages for prescribed events, for example receipt of a message in a unified messaging system (e.g., a received voicemail, e-mail, fax, SMS message).

As described below, any of the services provided by the respective servers 16 can be supplied and displayed to the Voice over IP telephone device 12 based on commands (i.e., "requests") that specify GUI operations to be performed by the Voice over IP telephone device 12. In addition, a locally executable application (i.e., an application executed by the Voice over IP telephone device 12) may include a device manager configured for establishing a default communications with the call server 16a: the locally executable application also may specify GUI operations to be performed by generating a request, described below. If additional services are desired by the user of the Voice over IP telephone device 12, the user may generate a request for initiation of such services using, for example, a services installation application which may be executable locally within the Voice over IP telephone device 12, or a remote server such as the call server 16a.

In addition, the Voice over IP telephone 12 may receive notification messages from servers such as the newscast server 16c or the notification server 16d, independent of any actions by the user of the Voice over IP telephone device 12.

Hence, arbitrary services can be provided to the user of the Voice over IP telephone device 12 based on execution of local application or servers (i.e., remote applications), using a generic application-based command set for control and configuration of the user interface components of the Voice over IP telephone device 12 described below.

Figure 2:
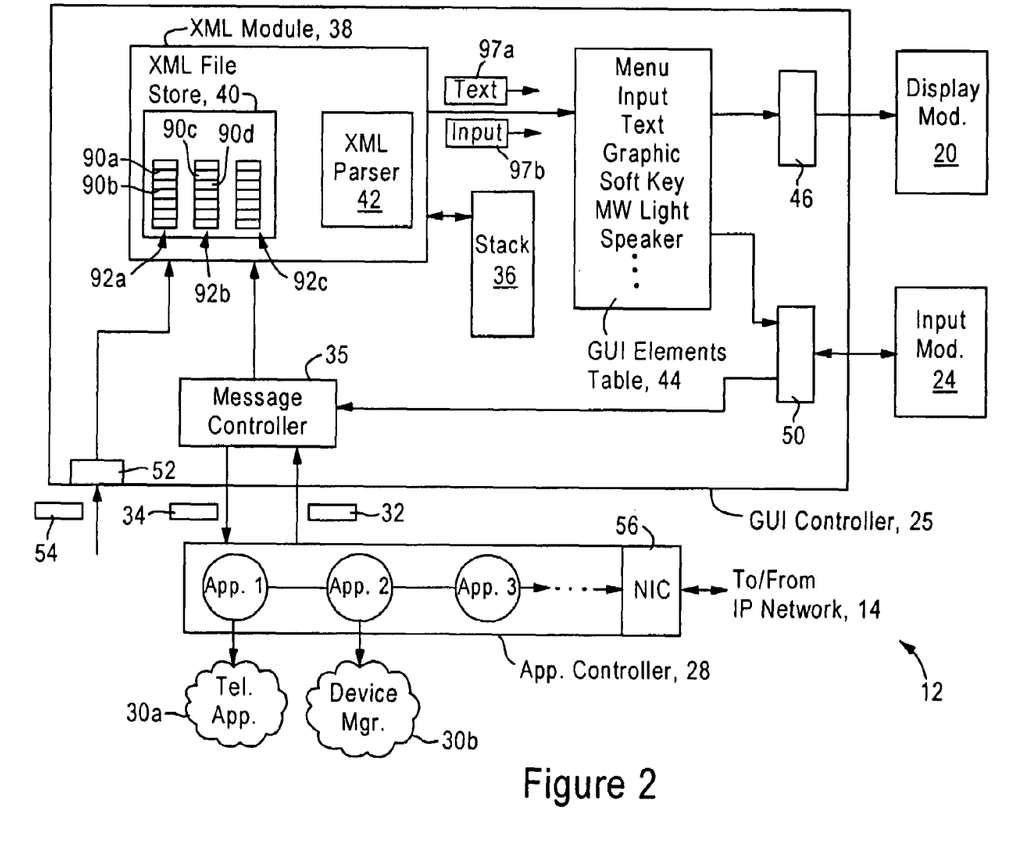
FIG. 2 is a diagram illustrating in detail the Voice over IP telephone device of FIG. 1 according to an embodiment of the present invention.

FIG. 2 is a block diagram illustrating in detail the Voice over IP telephone device 12 according to the embodiment of the present invention. The Voice over IP telephone device 12 includes a display screen 20 configured for displaying display elements 22, illustrated in FIG. 1. For example, the display screen 20 may display an application window 22a having soft key buttons 22b for window-specific user input options. Additional display elements may be implemented as tab keys 22c that identify additional application services that may be selected by a user, where a user selects the corresponding application by pressing the corresponding tab 22c. Additional display elements may be implemented as telephone device elements 22d that may indicate device-specific state information, any one of which may be used to provide a hierarchal menu list based on pressing the corresponding soft key input.

The Voice over IP telephone device 12 also includes a user input interface 24 configured for detecting user inputs to soft key elements (e.g., 22b, 22c, or 22d) or hard key elements 26, illustrated in FIG. 1 as a twelve button keypad 26a, and function keys 26b. Hence, the user input interface 24, illustrated in FIG. 2, is configured for enabling the soft keys and the hard keys 26 based on application-based commands, and supplying user inputs for processing by the appropriate executable applications, described below. The Voice over IP telephone device 12 also includes audio driver circuitry (not shown) for playing audio files to an external speaker 27 distinct from the telephone handset 29.

The Voice over IP telephone device 12 also includes a graphic user interface (GUI) controller 25, and an application controller 28. The Voice over IP telephone device 12 also includes locally executable applications 30, for example a telephone application 30a configured for initiating and receiving Voice over IP based telephone calls between the call server 16a according to Voice over IP protocol, for example, Media Gateway Control Protocol (MGCP) (RFC 2705), Session Initiation Protocol (SIP) (RFC 2543), H.323 protocol, etc. Other examples of locally executable applications include a device manager 30b configured for managing local operation of the Voice over IP telephone device 12.

The GUI controller 25 is configured for receiving application-based commands (i.e., "requests") 32 from the application controller 28 that specify an application state (specified by an XML document 90) to be performed. For example, each application-based command 32 is received by the GUI controller 25 in the form of a text-based message, and specifies at least one of a display operation that specifies display parameters for a display element 22, an input operation specifying an input operation for a soft key or a hard key by the user input interface 24, and/or response logic enabling the GUI controller 25 to determine how to respond to a prescribed user input supplied by the user input interface 24.

The GUI controller 25 also is configured for outputting application-based responses (i.e., "posts") 34 based on the supplied user inputs from the user input interface 24 and based on the application-based commands that specify the manner in which the posts 34 should be generated. Hence, each application, executed locally (e.g., application 30) or remotely (e.g., a server 16), operate according to a request/response system, enabling deployment of arbitrary application within the Voice over IP telephone device 12 based on standardized messaging protocols, described below.

Figure 4:
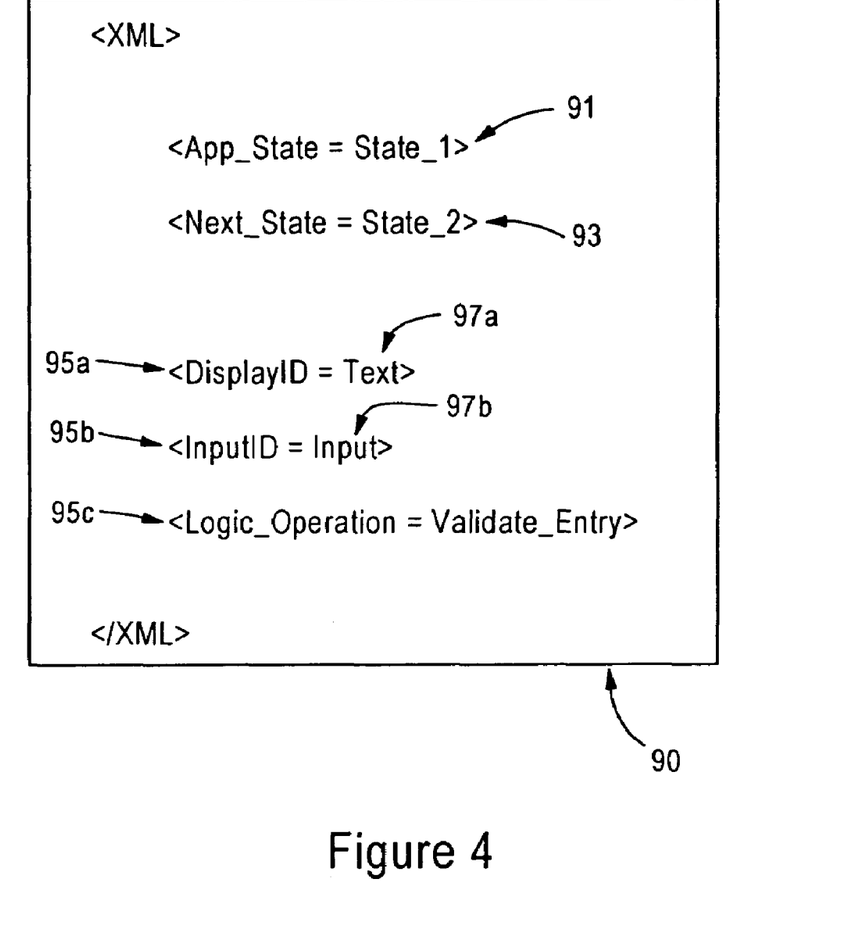
FIG. 4 is a diagram illustrating one of the XML documents stored in the XML file store of FIG. 2.

The Voice over IP telephone device 12 implements application-specific messaging using extensible markup language (XML) documents 90, referred to as "application state documents", that are used to define the generic messaging protocol (i.e., command set) available to executable applications. In particular, the GUI controller 25 includes a stack 36, and an XML module 38. The XML module 38 includes an XML file store 40 for storing XML documents 90, and an XML parser 42 for parsing a selected XML document. As illustrated in FIG. 4, each XML document 90 corresponds to a specified state 91 of an executable application (hence the term "application state document"), and may reference another XML document 93. Each XML document 90 includes XML tags 95 that specify an operation to be performed: for example, XML tags can specify the manner in which display elements 20 are to be displayed (e.g. 95a), how input operations are to be performed by the user input interface 24 (e.g., 95b), how inputs supplied by a user should be interpreted (e.g. 95c), how audio files should be played, etc.

In other words, an XML document 90 can specify any operation to be performed, for example displaying text, graphics, or video (stored locally within the GUI controller 25 as interface elements or supplied from a remote location via the IP network), playing an audio (e.g., .wav) file (stored locally as an interface element or supplied with the command), or initiating a prescribed procedure. Each XML document 90 also has a corresponding identifier that enables the executable applications (e.g., 30 or 16) to identify for execution a prescribed interface operation (e.g., displaying a prescribed display element and providing prescribed input operations).

As described above, each XML document (e.g., 90a) specifies a prescribed application state 91, and may reference another XML document (e.g., 90b) that specifies another corresponding application state 93 for the same executable application. Hence, the XML application state documents 90 are grouped into XML applications 92, where a group of application state documents 90 collectively define the XML-based application to be performed. Hence, the XML application state documents 90 are stored within an XML file store 40 in groups of XML applications 92a, 92b, and 92c. For example, the XML documents 90a and 90b specify respective states of the XML application 92a, and the XML documents 90c and 90d specify respective states of the XML application 92b.

The XML documents for a prescribed application typically are loaded in the XML file store 40 as default documents; alternately, newer application-specific XML documents 92 may be loaded into the XML file store 40 during registration of a new application service. The stack 36 is configured for storing active XML documents used by the GUI controller 25 for active applications. The XML parser 42 is configured for generating display element identifiers 97a specifying display elements to be displayed (i.e., display operations), input identifiers 97b that specify the input operations to be performed by the user input interface 24, and any other identifiers specified during the selected XML document based on the application-specific commands 32 (e.g., video or audio operations).

In particular, the graphic user interface (GUI) controller 35 is configured for parsing the text strings 32 and recovering the application specific commands (e.g., the XML document identifiers), and forwarding the application-specific commands to the XML module 38. For example, the application specific command may specify the XML document 90 to be retrieved from the XML file store 40 and parsed to determine the interface elements to be applied. The XML parser 42, upon parsing the selected XML document, outputs the identifiers specified in the parsed XML document to a GUI elements table 44.

The GUI elements table 44 is configured for storing available interface elements, for example menu elements, input elements, text elements, graphic elements, soft key elements, hardware light elements, speaker elements, etc. Each GUI element specifies instructions and parameters that enable the generation of the corresponding interface operation. The GUI elements table 44 outputs the selected elements to a display abstraction interface 46 and/or an input abstraction interface 50, or the speaker 27 as appropriate. The display abstraction interface 46 is configured for generating display-specific images for display of the respective display elements by the display screen 20, and the input abstraction interface 50 is configured for generating hardware-specific commands for configuration of the user input interface for the respective selected input operations.

Hence, the local and remotely executed applications control the user interface of the Voice over IP telephone device 12 by sending text-based messages to the GUI controller 25; the text-based messages are used to identify an XML document 90, stored in the XML file store 40, to be parsed for identification of display elements and selected input operations to be provided to the display screen 20 and the user input interface 24, respectively. Specific data defining the display element and the input operations are retrieved from the GUI element table 44 and forwarded to the appropriate hardware abstraction interface 46 or 50. The hardware abstraction interfaces convert the supplied GUI elements to hardware-specific instructions to cause the display screen 20 and the user input interface 24 to provide the appropriate interface elements.

The GUI controller 25 also include a messaging interface 52 configured for receiving event messages 54, composed of text-based messaging. In particular, the event messages are time-oriented messages that specify the occurrence of prescribed events, for example a one second timer for updating the time display element, or other time-oriented messages occurring independently of local or remote application states. The event messages may be sent either to the XML module 38 for parsing a prescribed XML document 90 (e.g., for playing an audio or video announcement), or to the GUI elements table 44 for generation of a display element including the supplied text.

Figure 3A:
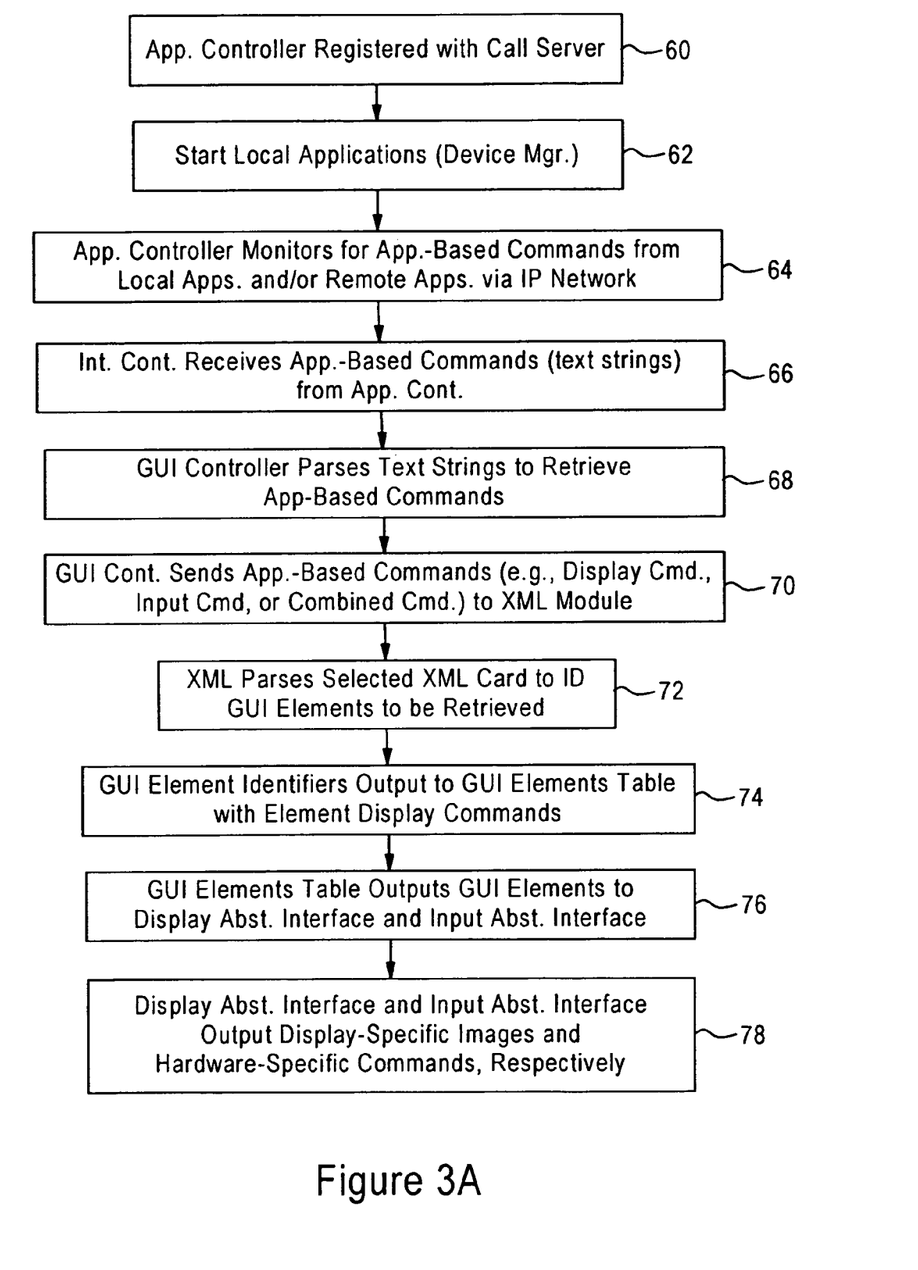
FIGS. 3A and 3B are diagrams illustrating the method of providing arbitrary applications to the Voice over IP telephone device of FIGS. 1 and 2, according to an embodiment of the present invention.
Figure 3B:
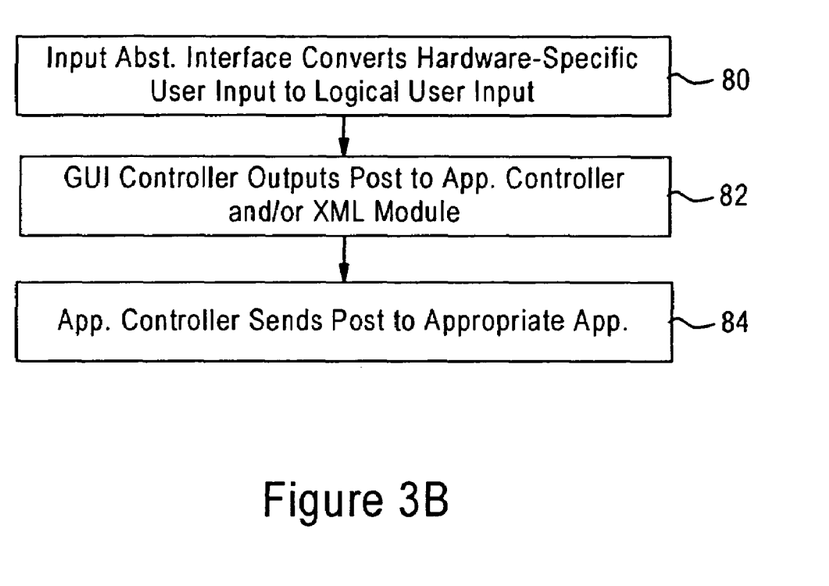

FIGS. 3A and 3B are diagrams summarizing the method of providing graphic user interface control for the Voice over IP telephone device 12 based on arbitrary services provided by execution of application resources, either locally or remotely, according to an embodiment of the present invention. The steps described in FIGS. 3A and 3B can be implemented as executable code stored on a computer readable medium (e.g., a hard disk drive, a floppy drive, a random access memory, a read only memory, an EPROM, a compact disc, etc.).

The method begins in step 60, where the application controller 28, configured for identifying executable applications, is registered with the call server 16a and/or 16e. For example, the device manager 30b makes a request for service to the call server 16a via the network interface card 56 based on a prescribed IP address identifiable by the device manager 30b. The device manager 30b then initiates the execution of local applications in step 62 as the Voice over IP telephone is powered on.

The application controller 28 begins to monitor in step 64 for application-based commands received from either the local application 30 or the remote applications executable within the servers 16, which may send the commands to the Voice over IP telephone device 12 by the IP network 14.

The GUI controller 25 receives the application-based commands 32 in a form of text string from the application controller 28 in step 66. The message controller 35 parses the text string within the command 32 to recover the application-based commands in step 68, and sends the application based command to the XML module 38 for processing. As described previously, the application-based command 32 specifies an XML document 90 to be parsed; the XML document may have tags defining a display operation for the display screen 20, an input operation for a selected input operation for the user input interface 24, or a combination thereof; in addition, the XML document 90 may specify the manner in which a user input command should be interpreted by the message controller 35.

The XML module 38 parses in step 72 the selected XML document 90 specified by the application-based command 32 to identify the GUI elements to be retrieved from the GUI elements table 44. The XML module 38 outputs the GUI element identifiers in step 74 to the GUI elements table 44, along with any necessary element display commands, for retrieval of the GUI elements specified by the XML document.

The GUI element table 44 outputs in step 76 the accessed GUI elements to the display abstraction interface and/or the input abstraction 50, as appropriate, causing the display abstraction interface 46 and the input abstraction 50 to output in step 78 display specific images and hardware-specific commands, respectively.

Hence, the segregation of graphic and input operation from application-based operations enables multiple applications to independently provide commands to the Voice over IP telephone device 12, providing the integration of multiple controllers into a single device. Hence, multiple application services may be provided concurrently on the Voice over IP telephone device 12 where a user can concurrently use the device 12 for a Voice over IP call, while performing web browsing, search, retrieval, etc. using the display 20 and the interface 24.

In addition, the integration of multiple controllers by enabling separate applications to be independently executed enables the Voice over IP telephone device 12 to support the independent reception and initiation of calls from multiple call servers. Hence, the call server 16a can be used for outgoing calls, the call server 16e for incoming calls; alternately, the call server 16a can be used for local or internal calls, and the call server 16e can be used for long distance calls, etc. Arbitration between selecting a call server 16a and 16e also can be performed using the XML documents stored in the Voice over IP telephone device 12, for example if there are two incoming calls at the same time from the call servers 16a and 16e.

FIG. 3B is a diagram illustrating in further detail a supply of user inputs to the executable applications. The input abstraction interface 50, in response receiving user inputs from the input interface 24, converts in step 80 the hardware-specific user inputs to logical user inputs. The message controller 35 outputs in step 82 a "post" (e.g., response) 34 to the application controller 28 and/or the XML module 38, based on user input supplied as part of the application-based command 32 received from the application controller. The application controller 28 sends the post 34 to the appropriate application in step 84, for example by identifying the post relative to the appropriate application.

According to the disclosed embodiment, arbitrary application services can be provided to a network enabled telephone device configured for storing XML based documents that specify display and input operations to be performed based on reception of prescribed text-based application commands. In addition, the hardware specific commands for controlling the display and the input interface are segregated, enabling application designers to develop generic (i.e., hardware-independent) application services for network-enabled Voice over IP telephone devices.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A network-enabled user interface device, the device including:
    a display screen configured for displaying display elements;
    a user input interface configured for supplying user inputs;
    an interface controller configured for receiving application-based commands for at least one of first operations, second operations, and third operations, the interface controller configured for causing the display screen to display the display elements based on the first operations, configuring the user input interface for selected input operations based on the second operations, and generating application-based responses based on the supplied user inputs and the third operations; and
    an application controller configured for communication with executable application operations having generated the application-based commands and selectively transferring the application-based responses to selected ones of the executable application operations, the application controller including a network interface configured for receiving the application-based commands and outputting selected ones of the application-based responses via an open protocol network;
    wherein the interface controller further includes:
    (1) an extensible markup language (XML) module configured for generating first identifiers specifying the display elements to be displayed and second identifiers specifying the input operations to be performed by the user input interface, based on parsing selected XML documents based on the application-based commands, the selected XML documents configured for specifying the first operations, the second operations and the third operations; and
    (2) a graphic user interface (GUI) elements table configured for storing available interface elements including the display elements and input elements, the GUI elements table configured for outputting the identified display elements specified in the first identifier for display on the display screen, and outputting selected input elements selected based on the second identifiers for configuration of the user input interface for the selected input operations.

2. The device of claim 1, wherein the interface controller includes:
    a display abstraction interface configured for generating display-specific images for display of the respective display elements by the display screen; and
    an input abstraction interface configured for generating hardware-specific commands for configuration of the user input interface for the respective selected input operations based on the input elements selected according to the second commands.

3. The device of claim 2, wherein the interface controller further includes a message controller configured for receiving the application-based commands as first text strings and generating the application-based responses as second text strings based on the supplied user inputs and the third operations, the message controller parsing the first text strings for retrieval of the application-based commands.

4. The device of claim 3, wherein the interface controller further includes a messaging interface configured for receiving event-based messages specifying event-based information to be provided to the user, the event-based information including any one of text information, audible information, text-based information, video information, and graphical information.

5. The device of claim 3, wherein the stored available interface elements includes menu elements, input elements, text elements, graphic elements, soft key elements, hardware light elements, and audio speaker elements.

6. The device of claim 1, further comprising a locally-executable resource configured for generating a first group of the application-based commands, the application controller configured for identifying a first of the application-based responses as corresponding to the locally-executable resource and in response outputting the first of the application-based responses to the locally-executable resource.

7. The device of claim 6, wherein the open protocol network is an Internet Protocol network.

8. The device of claim 1, further comprising a telephony portion configured for providing Voice over IP based communications via the open protocol network concurrent with the display of the display elements and the selected input operations.

9. A method of controlling a display screen and a user input interface of a network-enabled user interface device configured for network-based communications via an open protocol network, the method comprising:
    receiving application-based commands for execution of at least one of first operations, second operations, and third operations from at least one of a plurality of executable application operations, at least a first of the executable application operations in communication with the network-enabled user interface device via the open protocol network;
    first generating, by an interface controller, selected display elements based on the first operations and selected input operations elements based on the second operations;
    causing the display screen to display the selected display elements and the user input interface to execute the selected input operations elements; and
    second generating application-based responses based on supplied user inputs to the user input interface based on the selected input operations elements, and based on the third operations;
    wherein the interface controller further includes an extensible markup language (XML) module and a graphic user interface (GUI) elements table, the first generating step including:
    (1) identifying by the XML module the selected display elements to be displayed and input operations to be performed by the user input interface, based on parsing selected XML documents based on the application-based commands, the selected XML documents configured for specifying the first operations, the second operation and the third operations; and
    (2) outputting from the GUI elements table the selected display elements to be displayed on the display screen, and the selected input operations elements based on the identified input operations for execution of the selected input operations elements by the user input interface.

10. The method of claim 9, wherein:
the receiving step includes receiving multiple groups of application-based commands via the open protocol network from respective servers executing the respective executable application operations; and
the second generating step includes outputting the application-based responses to the respective servers via the open protocol network.

11. The method of claim 9, wherein the interface controller includes a display abstraction interface configured for generating display-specific images and an input abstraction interface configured for generating hardware-specific commands for configuration of the user input interface, the causing step including:
generating selected display-specific images for display of the respective display elements by the display screen; and
generating selected hardware-specific commands for configuration of the user input interface for the respective selected input operations based on input elements selected according to the second commands.

12. The method of claim 11, wherein:
the interface controller further includes a message controller configured for receiving the application-based commands as first text strings;
the receiving step includes parsing the first text strings for retrieval of the application-based commands; and
the second generating step includes generating the application-based responses as second text strings based on the supplied user inputs and the third commands.

13. The method of claim 12, wherein the first generating step further includes generating event-based information to be provided to the user, including any one of text information, audible information, text-based information, video information, and graphical information, based on receiving an event-based message specifying the event-based information to be provided to the user.

14. The method of claim 12, wherein the stored available interface elements include menu elements, input elements, text elements, graphic elements, soft key elements, hardware light elements, and audio speaker elements.

15. The method of claim 9, wherein the receiving step includes receiving a first group of the application-based commands via the open protocol network from respective servers executing the respective executable application operations, and receiving a second group of the application-based commands from a locally-executable resource, the second generating step including outputting the application-based responses to the respective identified executable application operations.

16. The method of claim 15, wherein the open protocol network is an Internet Protocol network.

17. The method of claim 9, further comprising providing voice over IP based communications via the open protocol network concurrent with the display of the display elements and the selected input operations.

18. A computer readable medium having stored thereon sequences of instructions for controlling a display screen and a user input interface of a network-enabled user interface device, configured for network-based communications via an open protocol network, the sequences of instructions including instructions for performing the steps of:
receiving application-based commands for execution of at least one of first operations, second operations, and third commands from at least one of a plurality of executable application operations, at least a first of the executable application operations in communication with the network-enabled user interface device via the open protocol network;
first generating, by an interface controller, selected display elements based on the first operations and selected input operations elements based on the second operations;
causing the display screen to display the selected display elements and the user input interface to execute the selected input operations elements; and
second generating application-based responses based on supplied user inputs to the user input interface based on the selected input operations elements, and based on the third operations;
wherein the interface controller further includes an extensible markup language (XML) module and a graphic user interface (GUI) elements table, the first generating step including:
(1) identifying by the XML module the selected display elements to be displayed and input operations to be performed by the user input interface, based on parsing selected XML documents based on the application-based commands, the selected XML documents configured for specifying the first operations, the second operation and the third operations; and
(2) outputting from the GUI elements table the selected display elements to be displayed on the display screen, and the selected input operations elements based on the identified input operations for execution of the selected input operations elements by the user input interface.

19. The medium of claim 18, wherein:
the receiving step includes receiving multiple groups of application-based commands via the open protocol network from respective servers executing the respective executable application operations; and
the second generating step includes outputting the application-based responses to the respective servers via the open protocol network.

20. The medium of claim 18, wherein the interface controller includes a display abstraction interface configured for generating display-specific images and an input abstraction interface configured for generating hardware-specific commands for configuration of the user input interface, the causing step including:
generating selected display-specific images for display of the respective display elements by the display screen; and
generating selected hardware-specific commands for configuration of the user input interface for the respective selected input operations based on input elements selected according to the second commands.

21. The medium of claim 20, wherein:
the interface controller further includes a message controller configured for receiving the application-based commands as first text strings;
the receiving step includes parsing the first text strings for retrieval of the application-based commands; and
the second generating step includes generating the application-based responses as second text strings based on the supplied user inputs and the third commands.

22. The medium of claim 21, wherein the first generating step further includes generating event-based information to be provided to the user, including any one of text information, audible information, text-based information, video information, and graphical information, based on receiving an event-based message specifying the event-based information to be provided to the user.

23. The medium of claim 21, wherein the stored available interface elements include menu elements, input elements, text elements, graphic elements, soft key elements, hardware light elements, and audio speaker elements.

24. The medium of claim 18, wherein the receiving step includes receiving a first group of the application-based commands via the open protocol network from respective servers executing the respective executable application operations, and receiving a second group of the application-based commands from a locally-executable resource, the second generating step including outputting the application-based responses to the respective identified executable application operations.

25. The medium of claim 24, wherein the open protocol network is an Internet Protocol network.

26. The medium of claim 18, further comprising instructions for performing the step of providing voice over IP based communications via the open protocol network concurrent with the display of the display elements and the selected input operations.

27. A network-enabled user interface device having a display screen and a user input interface and configured for network-based communications via an open protocol network, the device further comprising:
  means for receiving application-based commands for execution of at least one of first operations, second operations, and third operations from at least one of a plurality of executable application operations, at least a first of the executable application operations in communication with the network-enabled user interface device via the open protocol network;
  means for first generating, by an interface controller, selected display elements based on the first operations and selected input operations elements based on the second operations;
  means for causing the display screen to display the selected display elements and the user input interface to execute the selected input operations elements; and
  means for second generating application-based responses based on supplied user inputs to the user input interface based on the selected input operations elements, and based on the third operations;
  wherein the interface controller further includes an extensible markup language (XML) module and a graphic user interface (GUI) elements table, the means for first generating configured for:
  (1) identifying by the XML module the selected display elements to be displayed and input operations to be performed by the user input interface, based on parsing selected XML documents based on the application-based commands, the selected XML documents configured for specifying the first operations, the second operation and the third operations; and
  (2) outputting from the GUI elements table the selected display elements to be displayed on the display screen, and the selected input operations elements based on the identified input operations for execution of the selected input operations elements by the user input interface.

28. The device of claim 27, wherein:
  the receiving means is configured for receiving multiple groups of application-based commands via the open protocol network from respective servers executing the respective executable application operations; and
  the second generating means is configured for outputting the application-based responses to the respective servers via the open protocol network.

29. The device of claim 27, wherein the interface controller includes a display abstraction interface configured for generating display-specific images and an input abstraction interface configured for generating hardware-specific commands for configuration of the user input interface, the causing means configured for:
  generating selected display-specific images for display of the respective display elements by the display screen; and
  generating selected hardware-specific commands for configuration of the user input interface for the respective selected input operations based on input elements selected according to the second commands.

30. The device of claim 29, wherein:
  the interface controller further includes a message controller configured for receiving the application-based commands as first text strings;
  the receiving means is configured for parsing the first text strings for retrieval of the application-based commands; and
  the second generating means is configured for generating the application-based responses as second text strings based on the supplied user inputs and the third commands.

31. The device of claim 30, wherein the first generating means is configured for generating event-based information to be provided to the user, including any one of text information, audible information, text-based information, video information, and graphical information, based on receiving an event-based message specifying the event-based information to be provided to the user.

32. The device of claim 30, wherein the stored available interface elements include menu elements, input elements, text elements, graphic elements, soft key elements, hardware light elements, and audio speaker elements.

33. The device of claim 27, wherein the receiving means is configured for receiving a first group of the application-based commands via the open protocol network from respective servers executing the respective executable application operations, and receiving a second group of the application-based commands from a locally-executable resource, the second generating means configured for outputting the application-based responses to the respective identified executable application operations.

34. The device of claim 33, wherein the open protocol network is an Internet Protocol network.

35. The device of claim 27, further comprising means for providing voice over IP based communications via the open protocol network concurrent with the display of the display elements and the selected input operations.

* * * * *